July 18, 1967 R. M. CARLISLE ET AL 3,331,991

SWITCHING MATRIX

Filed March 25, 1966 5 Sheets-Sheet 1

INVENTOR.
RAYMOND MELVIN CARLISLE
JAMES ALEXANDER FRAUNFELDER
BY Curtis, Morris & Safford July 18, 1967 R. M. CARLISLE ET AL 3,331,991

SWITCHING MATRIX

Filed March 25, 1966

5 Sheets-Sheet 2

INVENTOR.
RAYMOND MELVIN CARLISLE
JAMES ALEXANDER FRAUNFELDER
BY Curtis, Morris & Safford

SWITCHING MATRIX

Filed March 25, 1966

5 Sheets-Sheet 3

INVENTOR.
RAYMOND MELVIN CARLISLE
JAMES ALEXANDER FRAUNFELDER
BY Curtis, Morris & Safford INVENTOR.
RAYMOND MELVIN CARLISLE
JAMES ALEXANDER FRAUNFELDER
BY Curtis, Morris & Safford

SWITCHING MATRIX

Filed March 25, 1966 5 Sheets-Sheet 5

INVENTOR.
RAYMOND MELVIN CARLISLE
JAMES ALEXANDER FRAUNFELDER
BY Curtis, Morris + Safford

United States Patent Office 3,331,991

Patented July 18, 1967

3,331,991

SWITCHING MATRIX

Raymond Melvin Carlisle, Enhaut, and James Alexander Fraunfelder, North Wales, Pa., assignors to AMP Incorporated, Harrisburg, Pa.

Filed Mar. 25, 1966, Ser. No. 537,527

14 Claims. (Cl. 317—113)

This invention relates to a switching matrix and more particularly to a switching matrix for use with video and/or audio equipment or the like.

In the field of video transmission, vertical retrace takes a finite amount of time which is commonly known as the vertical interval. No picture is transmitted during this time interval, and this is the most desirable time in which to accomplish switching from one source to another source. This is especially true during the transmission of color. Random switching is however used extensively. Present equipment is capable of providing no-gap switching from one source to another source as well as isolation therebetween, but this equipment is without any expandable capabilities to provide effective no-gap switching from one source to another source as well as proper isolation between the sources.

It is therefore an object of the invention to provide a no-gap switching matrix to switch one source to another source during the vertical retrace or at random.

Another object of the invention is the provision of a switching matrix having excellent isolation between sources.

A further object of the invention is to provide a tree in the output bus of the switching matrix for keeping the output transmission line length substantially constant irregardless of which input that is selected.

An additional object of the invention is the provision of a switching matrix wherein the physical distances between the component input impedance are negligible compared to a wave length of the input frequencies so that the input impedance components can be lumped to their parallel equivalent of any desirable impedance value thereby obviating input amplifiers.

A still further object of the invention is to provide a switching matrix in which switching units are pluggably disposed.

A still additional object of the invention is the provision of a switching matrix in which shielded pluggable switching units are disposed.

Still a further object of the invention is to provide a switching matrix of modular construction which is readily adapted to mass production capabilities.

Still an additional object of the invention is the provision of a switching matrix to facilitate custom design of a switching system with a minimum of engineering time.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are achieved by means of structure comprising a chassis means; circuit means on the chassis means including input bus means, output bus means and control bus means; switch means pluggably disposed in the chassis means including input circuit means connectable to the input bus means, output circuit means connectable to the output bus means and control circuit means connectable to the control bus means; means for connecting the input, output and control circuit means of the switch means respectively to the input, output and control bus means of the chassis means, shield means provided between the input and output bus means on the chassis means and between the chassis means and the switch means, and means included in said switch means to connect said input bus means to said output bus means. The output bus means on the chassis means has a substantially constant length from one output thereon to any other output thereon.

Figures 1, 5A:
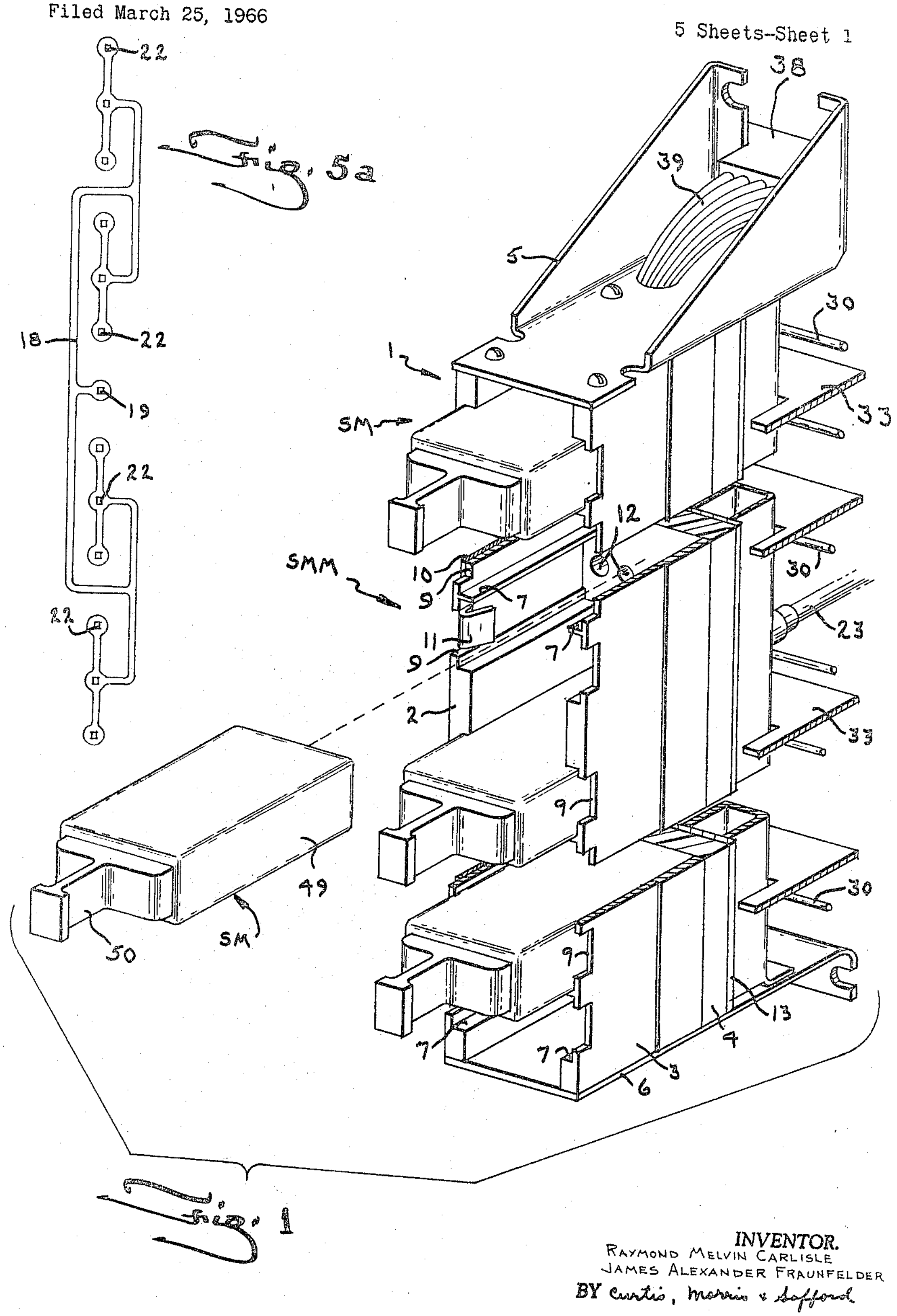
FIGURE 1 is a front, exploded perspective partially sectioned view of a switching matrix module.
Figure 7:
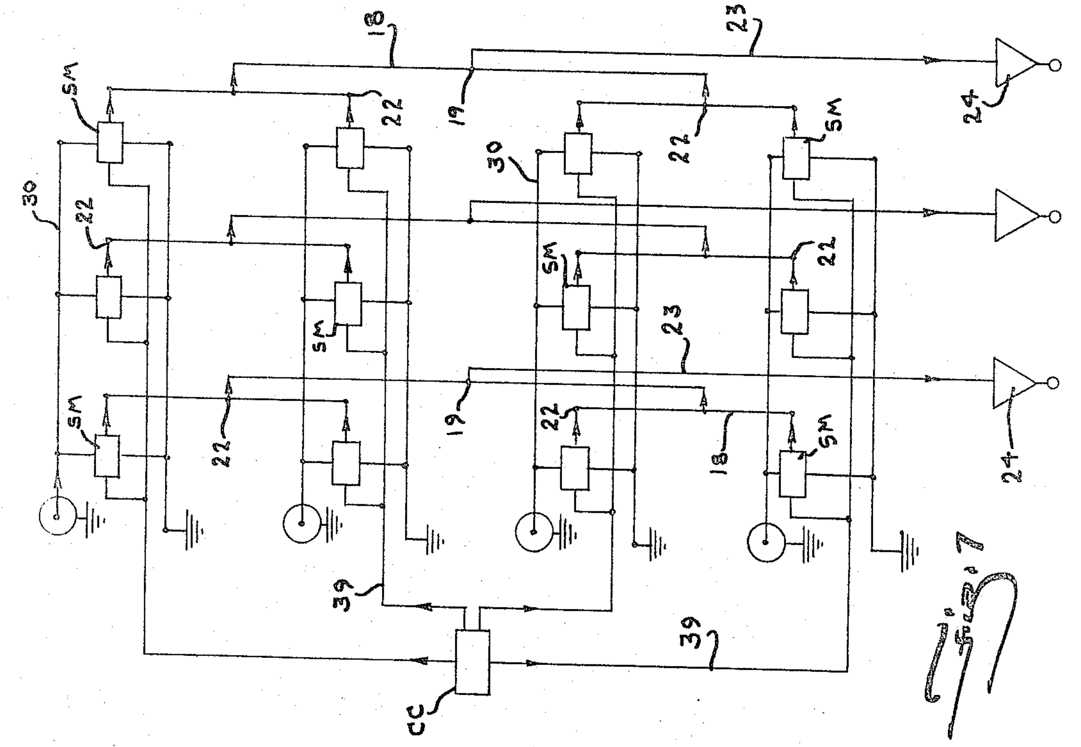
Figure 6:
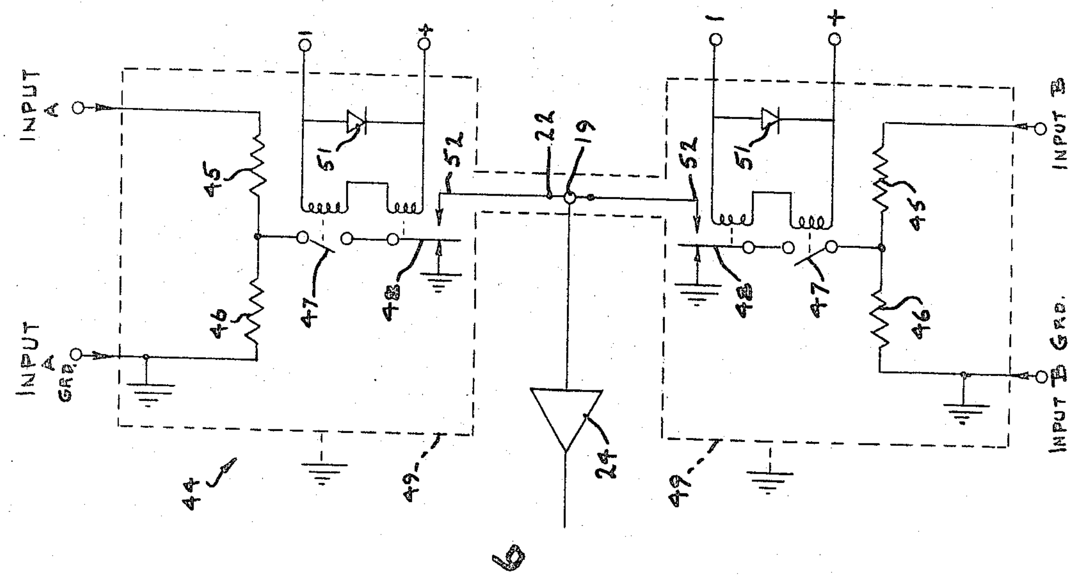

FIGURE 5*a* is a view showing the output tree on the printed circuit board;

FIGURE 6 is a schematic wiring diagram of switching modules pluggable into a chassis of a switching matrix module; and FIGURE 7 is a schematic wiring diagram of a four by three matrix.

Figure 2:
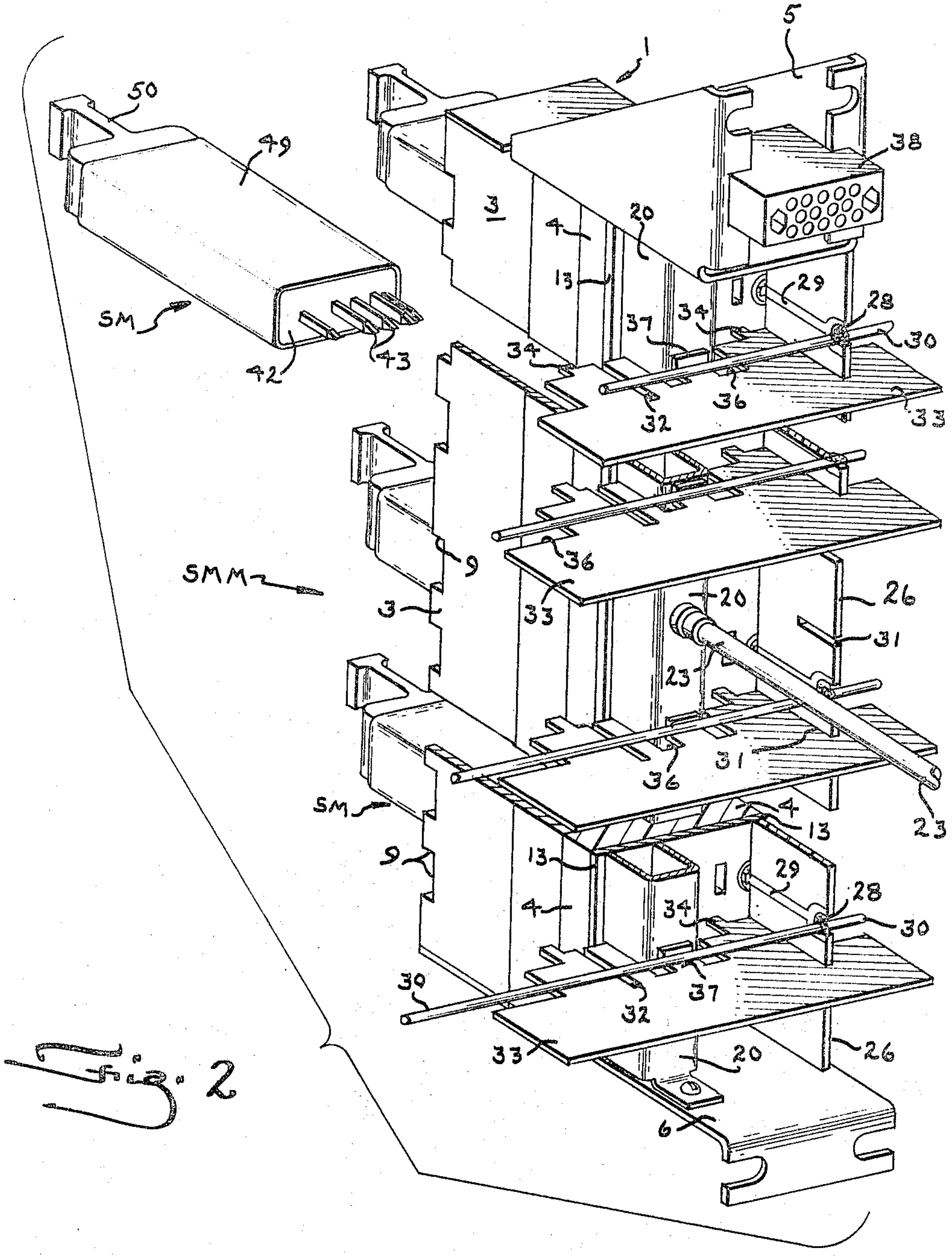
FIGURE 2 is a view similar to FIGURE 1 but of a rear view thereof.
Figure 3:
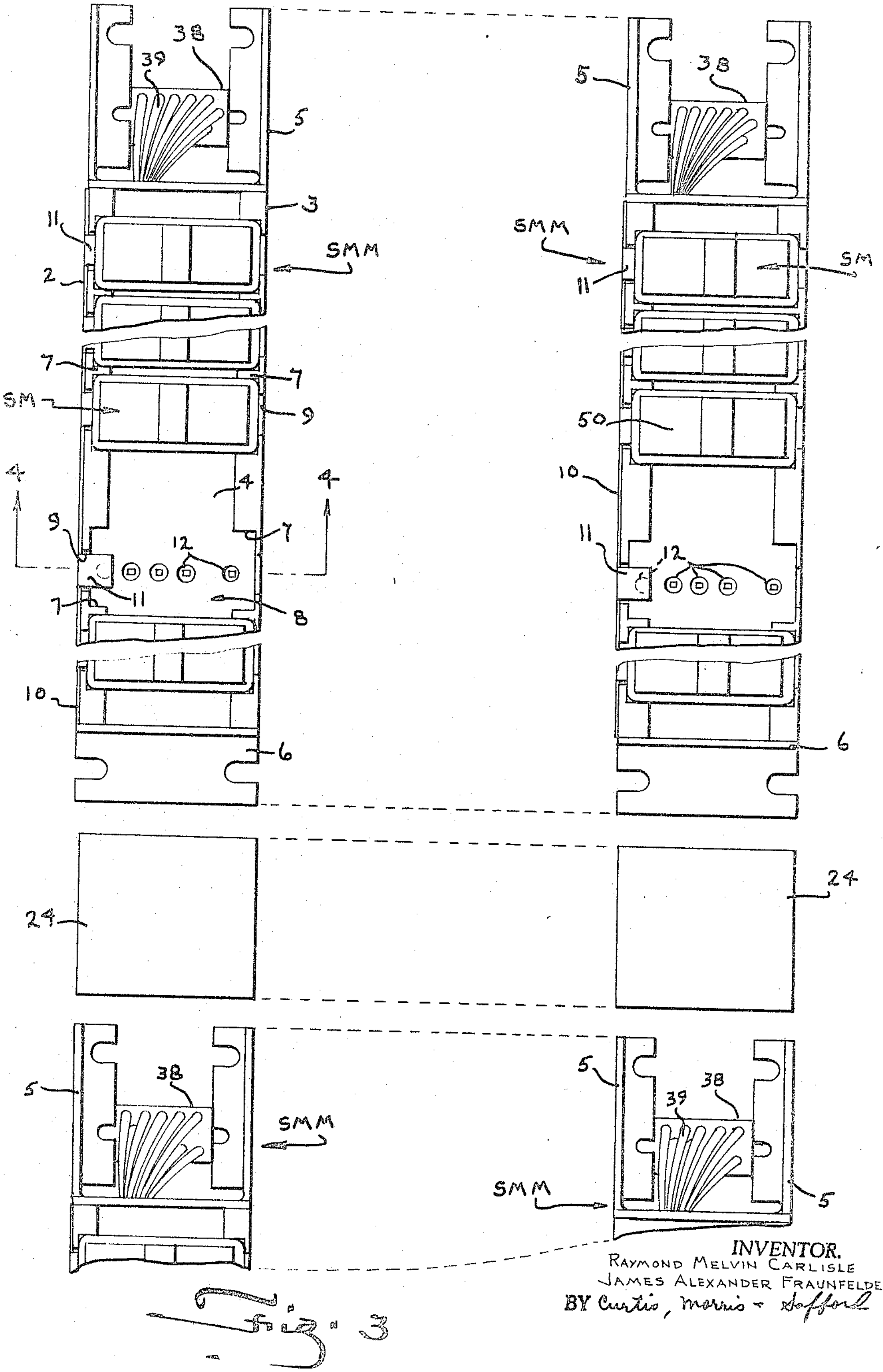
FIGURE 3 is a front elevational view of switching matrix modules forming a switching matrix.

Turning now to the drawings, there is illustrated in FIGURES 1 and 2 a switching matrix module SMM comprising a chassis 1 in which switching modules SM are pluggable. Chassis 1 includes metallic sides 2 and 3 secured to a bottom dielectric member 4. Mounting brackets 5 and 6 are secured to respective ends of sides 2 and 3 and bottom member 4. Inwardly-directed rails 7 are disposed on the inside surface of each side 2 and 3 and each rail 7 on side 2 is disposed opposite a corresponding rail 7 on side 3 to define guide means and cavities 8 (see FIGURE 3) are formed between adjacent pairs of rails in each side. The outer surfaces of sides 2 and 3 have recesses 9 disposed therein between pairs of rails.

A metal plate 10 having good spring characteristics is secured to one of sides 2 or 3 and plate 10 includes grounding springs 11 disposed in respective recesses 9 and extending within each cavity 8 toward bottom member 4 and outwardly from the side to which plate 10 is secured. Bottom member 4 has a series of holes 12 in communication with each cavity 8.

Figure 5:
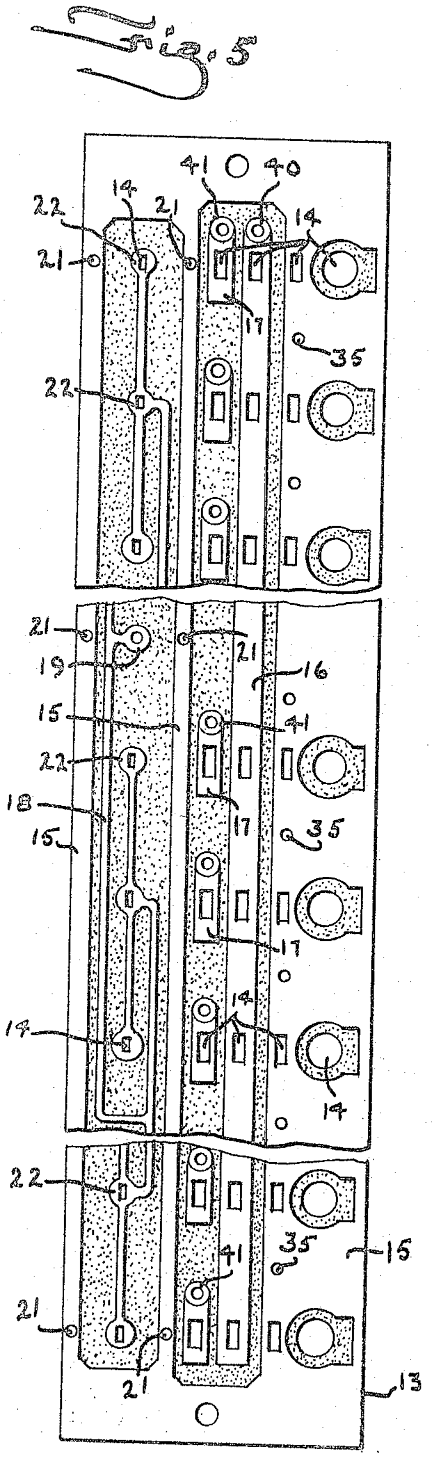
FIGURE 5 is a plan view of a printed circuit board for use on the switching matrix modules.

A printed circuit board 13 is secured to the bottom surface of bottom member 4. Printed circuit board 13, as illustrated in FIGURE 5, includes a series of openings 14 in communication with a respective series of openings 12 in bottom member 4. A ground plane 15 is disposed on printed circuit board 13 along with a common control conductive path 16, control conductive paths 17 and an output conductive path 18. Paths 16 and 17 constitute control bus means. An output terminal 19 is connected to output path 18 constituting an output tree or output bus at the central location thereof and output terminal 19 is connected to a coaxial connector 20′ centrally located on output bus shield 20 which is a channel-shaped metallic member having projections (not shown) secured in holes 21 in ground plane 15 and is in electrical connection therewith. Each opening 14 along output tree 18 has an output terminal 22 which is connected to output terminal connection 19 via tree 18. The distance between each output terminal 22 and output terminal connection 19 is substantially the same as illustrated in FIGURE 5a. A coaxial cable and connector combination 23 is connected between the coaxial connector on output bus shield 20 and a conventional output amplifier 24, FIGURE 3, associated with each switching matrix module SMM. Electrical connectors 25, preferably of the type disclosed in U.S. patent application Ser. No. 302,653, filed Aug. 16, 1963, now U.S. Patent No. 3,270,251, are electrically connected to ground plane 15, common control conductive path 16, control paths 17, and output tree 18 at each opening 14 of printed circuit board 13 except the large circular openings 14 to the right of the printed circuit board as illustrated in FIGURE 5. Connectors 25 are disposed in openings 12 of bottom member 4 as illustrated in FIGURE 4.

Figure 4:
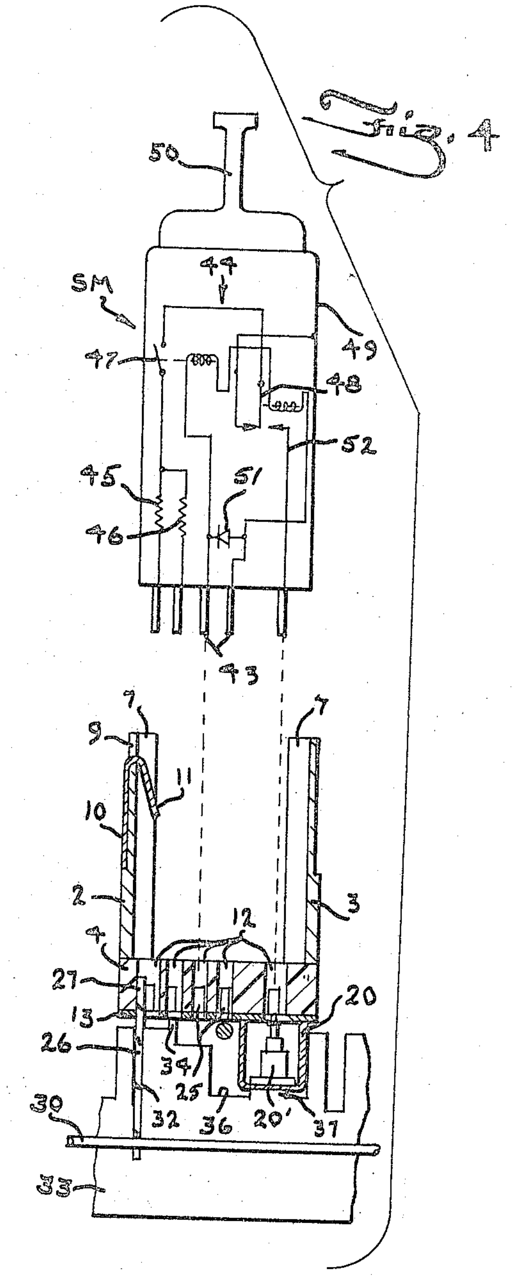
FIGURE 4 is a cross-sectional and exploded view taken along lines 4—4 of FIGURE 3.

An input printed circuit board 26 is secured onto printed circuit board 13 adjacent large circular openings 14 and includes spaced extensions 27 therealong disposable in corresponding ones of the large circular openings 14 and holes 12 (see FIGURE 4). Recesses 28 are located in the outer portion of board 26 opposite each extension 27 and a conductive portion 29 extends between each extension 27 and recess 28 as illustrated in FIGURE 2. An electrical connector 25 is secured on each extension 27 in electrical contact with conductive portion 29 and this electrical connector is disposed within respective large circular openings 14 and large circular hole 12 (FIGURE 4). An input bus 30 is disposed in each recess 28 and is electrically connected to a corresponding conductive portion 29. Slots 31 are disposed in board 26 between recesses 28 and slot 32 of a metal shielding member 33 is matable in a respective slot 31 of board 26 so that shielding is provided between adjacent input busses 30. Each shielding member 33 has a projection 34 electrically securable in a corresponding hole 35 in ground plane 15 of printed circuit board 13 (FIGURE 5). A cut-out 36 is provided in shielding member 33 at the location of output bus shield 20 and an L-shaped lug 37 is located in this cut-out in engagement with output bus shield 20. Slot 32, projection 34, cut-out 36 and L-shaped lug 37 are disposed at spaced locations along each shielding member 33 where additional switching matrix modules are located and input busses 30 extend along these additional switching matrix modules and are connected to boards 26 thereon. Shielding members 33 provide excellent shielding between adjacent input busses 30.

A connector block 38 is disposed in mounting bracket 5 in which electrical terminals (not shown) are disposed for matable engagement with other electrical connector members (not shown). Control leads 39 are electrically connected to respective electrical connector members in connector block 38 and one of these control leads is electrically connected to terminal 40 of control common lead 16 while the other control leads are electrically connected respectively to terminals 41 of control leads 17.

Switching modules SM comprise a dielectric member 42 (FIGURE 2) carrying electrical terminals 43 which are matable with electrical connectors 25 disposed in cavities 8. Dielectric member 42 also carries a switching circuit 44 preferably disposed on a printed circuit board as shown in FIGURES 4 and 6. The input circuit of switching circuit 44 comprises serially connected resistances 45 and 46. Resistance 45 is larger than resistance 46 and it is connected to an input bus 30. Resistance 46 is connected to ground. The junction of resistances 45 and 46 is connected to one side of normally open contacts of reed-relay 47. The other side of the reed-relay contacts is connected in series to the normally closed contacts of another reed-relay 48. One side of the normally closed contacts of reed-relay 48 is connected to a metallic housing 49 which houses switching circuit 44, dielectric member 42 and electrical terminals 43. Metallic housing 49 includes a handle 50 to facilitate inserting switching module SM into and out of a respective cavity 8 of switching matrix module SMM. The ground connection between the normally closed contacts of reed-relay 48 and housing 49 is preferably formed by means of a spring contact extending between the printed circuit board carrying switching circuit 44 and housing 49. The control circuits of reed-relays 47 and 48 are connected in series between respective terminals 43 and one side of the control circuit is connected to common control path 16 and a respective control path 17. A diode 51 is connected across the control circuits of reed-relays 47 and 48 in order to prevent any transients due to the interruptions of the relay circuits. A stationary contact 52 of reed-relay 48 is connected to an output terminal 22 of output tree 18 via an electrical terminal 43. Individual coils are provided for each reed-relay to prevent any capacitive coupling between the reed-relays.

The control windings of the reed-relays are connected via control leads 39 to a control circuit CC (FIGURE 7) completely disclosed and described in U.S. patent application Ser. No. 537,090, filed Mar. 24, 1966, to selectively actuate any of switching circuits 44 in order to connect any of input busses 30 to an output bus 18 of a switching matrix module SMM. Of course, control circuit CC can take any desirable form other than that disclosed in Ser. No. 537,090. As can be discerned from FIGURE 3, switching matrix modules SMM are suitably mounted in a cabinet or the like by means of mounting brackets 5 and 6 in horizontal rows of preferably ten in number. Output amplifiers 24 are also mounted in rows between respective rows of switching matrix modules SMM. FIGURE 7 illustrates a signal routing scheme representing a four by three matrix. Of course, the matrix can be of any desirable size. Switching modules SM are pluggably disposed in respective cavities 8 of chassis 1 and can be interchangeable if desired. Rails 7 guide housings 49 into the cavities so that terminals 43 electrically engage respective connectors 25, and handles 50 enable ready removal and insertion of the switching modules into and out of the cavities. Holes 12 and openings 14 are positioned in such a manner so that connectors 25 are matable with terminals 43 in accordance with a polarizing scheme to assure that circuits 44 are properly connected to the circuitry on printed circuit boards 13 and 26. Grounding springs 11 assure proper grounding of metallic housings 49. Springs 11 as well as the engagement of electrical terminals 43 with electrical connectors 25 frictionally retain the switching modules in place within cavities 8 of chassis 1.

Upon actuation of a selected switching module SM via the control circuit of the above mentioned patent application, the relay control circuit in the selected switching module is actuated so that reed-relay 47 is moved to its closed position before the normally closed contacts of reed-relay 48 are opened and moved into engagement with stationary contact 52 in order to connect an input bus 30 with an output bus 18. The time of operation of reed-relays 47 and 48 is less than the finite time of the vertical retrace. The switching matrix module of the invention provides a no-gap switching operation which is effectively isolated to provide uninterrupted switching of the input video sources to output video sources within the time interval of the vertical retrace without any interruption of picture transmission. Of course, switching module SM may be selectively operated at random instead of during the vertical retrace, if desired, but random switching generally results in disturbance of picture transmission. During the transmission of color video signals, it is however most desirable to provide the switching operation during the vertical retrace interval in order to provide optimum color fidelity. The switching matrix module of the invention will provide this fidelity.

The signal routing scheme of the switching matrix modules provides a distributed input impedance, however, the physical distances between the components of the input impedance are negligible compared to a wave length of the video frequencies. Thus, the input impedance components can be lumped to their parallel equivalent which can be designed to 75 ohms or any other desirable impedance value to effect the desired result. So long as the foregoing is followed, input amplifiers are not necessary.

Since the output bus is generally an improperly terminated transmission line, disturbances will occur due to standing wave. These disturbances will be different depending upon the length of this transmission line causing a differential frequency response with respect to the chosen input. Thus, a tree has been incorporated in the matrix which keeps this transmission line length substantially constant no matter which input is selected. Any frequency response disturbance due to standing wave is substantially constant regardless of which input that is selected and this disturbance can be compensated in a common mode, i.e. in the output amplifier.

The switching matrix module is readily adaptable to a split matrix wherein an input bus may be split and connected to a selected number of outputs and the remainder of the input bus can be used as another input bus connected to other outputs. If this is done, backloading resistances must be added to equalize the input impedance to 75 ohms or other desirable impedance.

The switching matrix modules can be used to provide a switching system designed to the customers' needs which obviate the necessity of having to perform extensive testing.

As can be discerned, there has been disclosed a unique switching matrix to effectively switch input signal sources to output signal sources as desired and the switching matrix is readily expandable to provide effective no-gap switching as well as proper isolation between the sources to be switched. It is to be understood that while the present invention has been disclosed as switching video signals, the invention is readily adaptable to switch other frequencies within the video frequency spectrum, for example, from 60 cycles to 10 megacycles, as desired.

It will, therefore, be appreciated that the aforementioned and other desirable objects have been achieved; however, it should be emphasized that the particular embodiment of the invention, which is shown and described herein, is intended as merely illustrative and not as restrictive of the invention.

The invention is claimed in accordance with the following:

1. A video switching network comprising chassis means; circuit means on said chassis means including input bus means, output bus means and control bus means; switch means pluggably disposed in said chassis means including input circuit means connectable to said input bus means, output circuit means connectable to said output bus means and control circuit means connectable to said control bus means; means for connecting said input, output and control circuit means of said switch means respectively to said input, output and control bus means of said chassis means, shield means provided between said input and output bus means on said chassis means and between said chassis means and said switch means, and means included in said switch means to connect a selected one or ones of said input bus means by said control circuit means to said output bus means.

2. A video switching network according to claim 1 wherein said output bus means includes an output tree having a plurality of output terminals, an output terminal connection, conductive means connecting said output terminals to said output terminal connection, the length of said conductive means between said output terminals and said output terminal connection being substantially constant.

3. A video switching network according to claim 1 wherein grounding spring means are on said chassis means to engage said switch means and ground same to said chassis means.

4. A video switching network according to claim 1 wherein guide means are on said chassis means to guide said switch means in place within said chassis means.

5. A video switching matrix comprising a series of chassis means disposed in horizontal rows, a plurality of input bus means connected to each horizontal row of chassis means, output bus and control bus means on each of said chassis means, switch means corresponding to said input bus means pluggably mounted in each of said chassis means, said switch means including input circuit means connectable to said input bus means, control circuit means connectable to said control bus means and output circuit means connectable to said output bus means, means to selectively actuate said control circuit means of any switch means to connect said input bus means connected to said selected switch means to said output bus means, and shield means provided between said input and output bus means on said chassis means and between said chassis means and said switch means.

6. A video switching matrix according to claim 5 wherein said shield means includes metal plate means disposed between each input bus means along each of said horizontal rows.

7. A switching matrix to switch a plurality of input means to an output means comprising chassis means having a plurality of cavities therein equal to the number of said input means, switch means pluggably disposed in said cavities and including an input circuit, an output circuit and a control circuit, a control circuit bus on said chassis means, means for connecting said input circuit to respective input means, said output circuit to said output means and said control circuit to said control circuit bus, means to selectively actuate said control circuit of any one or ones of said switch means to connect said input means and said input circuit to said output circuit and said output means, and shield means between said input means and said output means, between said input means and between said chassis means and said switch means.

8. A switching matrix according to claim 7 wherein said cavities are provided with guide means to guide said switch means thereinto.

9. A switching matrix according to claim 7 wherein said switch means and chassis means have polarizing means to properly connect said circuits of said switch means wth said input, output and control bus means of said chassis means.

10. A circuit arrangement to interconnect a plurality of input bus means to a single output bus means comprising input circuit means connected to each of said input bus means, said single output bus means defining an output tree having output terminals corresponding to each of said input bus means and an output terminal connection, circuit paths connected to each of said output terminals and said output terminal connection, said circuit paths between said output terminals and said output terminal connection having substantially the same length, and connecting means connected between said input circuit means and said output terminals to selectively connect said input bus means to said single output bus means.

11. The circuit arrangement of claim 10 wherein said connecting means include switch means having control circuit means to operate said switch means.

12. The circuit arrangement of claim 10 wherein shield means is provided between each input bus means, between said input bus means and said single output bus means and between said selective connecting means and said input and single output bus means.

13. The circuit arrangement of claim 10 wherein said connecting means include shielded switch means pluggably connected between said input circuit means and said output terminals.

14. The circuit arrangement of claim 10 wherein single output means is spaced along said plurality of input bus means to form a matrix provided with connecting means between the input circuit means and the output terminals to selectively connect any of said plurality of input bus means to said single output bus means.

References Cited

UNITED STATES PATENTS

| | | | |
|---|---|---|---|
| 2,287,243 | 5/1942 | Hebert et al. | 317—120 |
| 3,193,731 | 7/1965 | Gerlach et al. | 317—101 |

ROBERT K. SCHAEFER, *Primary Examiner.*

M. GINSBURG, *Assistant Examiner.*